United States Patent
Martineau et al.

(10) Patent No.: US 7,606,736 B2
(45) Date of Patent: *Oct. 20, 2009

(54) WISH LIST

(75) Inventors: Teresa Martineau, Kirkland, WA (US); Arnold N. Blinn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 331 days.

This patent is subject to a terminal disclaimer.

(21) Appl. No.: 11/100,729

(22) Filed: Apr. 7, 2005

(65) Prior Publication Data

US 2005/0182688 A1    Aug. 18, 2005

Related U.S. Application Data

(62) Division of application No. 09/698,379, filed on Oct. 27, 2000.

(51) Int. Cl.
*G06Q 30/00* (2006.01)

(52) U.S. Cl. .......................................... 705/26; 705/27
(58) Field of Classification Search ................... 705/26, 705/27
See application file for complete search history.

(56) References Cited

U.S. PATENT DOCUMENTS

| | | | |
|---|---|---|---|
| 5,696,366 A | 12/1997 | Ziarno | |
| 6,073,140 A | 6/2000 | Morgan et al. | |
| 6,173,269 B1 * | 1/2001 | Solokl et al. | ................. 705/35 |
| 6,247,043 B1 | 6/2001 | Bates et al. | |

(Continued)

FOREIGN PATENT DOCUMENTS

WO    WO 9909726    2/1999

(Continued)

OTHER PUBLICATIONS

NetGift1, "Online registry makes holiday shopping sress-free, provides funds for children's hospital", Business wirem Dec. 13, 1999.*

(Continued)

*Primary Examiner*—Mark Fadok
(74) *Attorney, Agent, or Firm*—Shook, Hardy & Bacon LLP (57) ABSTRACT

An electronic item list system and method, such as a wish or gift list, for an electronic shopping mall/online shopping portal, or an item list system provided as a software service. The system and method provides a user with the ability to create a list of items that the user would like others to purchase for the user as a gift or as a list of items that the user would like to retain for a later purchase. A user interface is provided that allows the user to select items electronically to add to a user specific gift list. The items are not limited to specific products, but can include general product categories and/or products from a specific merchant or manufacturer. The user interface communicates through an interface component that extracts data from a number of databases. For example, the databases can include a merchant database, an offers database, a manufacturers database and a products database. The interface will extract data from one or all of the databases based on the amount of information in a gift list request and provide the best results. As records are removed from the databases, the interface allows for graceful degradation of the display, such that something is always displayed to the user.

8 Claims, 9 Drawing Sheets

U.S. PATENT DOCUMENTS

| | | | |
|---|---|---|---|
| 6,338,082 B1 | 1/2002 | Schneider | |
| 6,377,965 B1 | 4/2002 | Hachamovitch et al. | |
| 6,493,724 B1 | 12/2002 | Cusack et al. | |
| 6,499,052 B1 | 12/2002 | Hoang et al. | |
| 6,507,854 B1 | 1/2003 | Dunsmoir et al. | |
| 6,516,312 B1 | 2/2003 | Kraft et al. | |
| 6,519,573 B1 | 2/2003 | Shade et al. | |
| 6,519,589 B2 | 2/2003 | Mann et al. | |
| 6,546,403 B1 | 4/2003 | Carlson, Jr. et al. | |
| 6,609,106 B1 | 8/2003 | Robertson | |
| 6,611,814 B1* | 8/2003 | Lee et al. | 705/26 |
| 6,633,849 B1* | 10/2003 | Dodd | 705/1 |
| 6,671,259 B1 | 12/2003 | He et al. | |
| 6,687,746 B1 | 2/2004 | Shuster et al. | |
| 6,738,804 B1* | 5/2004 | Lo | 709/219 |
| 6,859,834 B1 | 2/2005 | Arora et al. | |
| 6,865,546 B1 | 3/2005 | Song | |
| 6,873,967 B1 | 3/2005 | Kalagnanam et al. | |
| 6,920,488 B1* | 7/2005 | Le Pennec et al. | 709/219 |
| 7,000,028 B1 | 2/2006 | Broadhurst et al. | |
| 7,013,292 B1* | 3/2006 | Hsu et al. | 705/37 |
| 7,130,814 B1* | 10/2006 | Szabo et al. | 705/26 |
| 7,213,246 B1 | 5/2007 | van Rietsc | |
| 7,293,194 B2 | 11/2007 | Kawamura et al. | |
| 2001/0036224 A1 | 11/2001 | Demello et al. | |
| 2002/0026439 A1 | 2/2002 | Monroe | |
| 2002/0065903 A1 | 5/2002 | Fellman | |
| 2002/0077929 A1* | 6/2002 | Knorr et al. | 705/26 |
| 2002/0091827 A1 | 7/2002 | King et al. | |
| 2002/0095298 A1* | 7/2002 | Ewing | 705/1 |
| 2002/0161630 A1* | 10/2002 | Kern et al. | 705/14 |
| 2003/0105763 A1 | 6/2003 | Chatfield et al. | |
| 2003/0208556 A1 | 11/2003 | Friedman et al. | |
| 2004/0078273 A1 | 4/2004 | Loeb et al. | |
| 2004/0098375 A1 | 5/2004 | DeCarlo, III | |
| 2005/0102354 A1 | 5/2005 | Hollenbeck et al. | |
| 2005/0177458 A1 | 8/2005 | Martineau et al. | |
| 2005/0182688 A1* | 8/2005 | Martineau et al. | 705/26 |
| 2005/0182689 A1 | 8/2005 | Martineau et al. | |
| 2005/0197927 A1 | 9/2005 | Martineau et al. | |

FOREIGN PATENT DOCUMENTS

| | | |
|---|---|---|
| WO | WO 0065511 A2 | 11/2000 |
| WO | WO 0231702 A1 | 4/2002 |

OTHER PUBLICATIONS

Netgift2, "Netgift registry employs Broadvision to bring one click closure to the perfict gift" PR newswire, Nov. 22, 1999.*

NetGift3, "NetGift debuts as exlusive USATODAY.com gift registry", Nov. 17, 1999.*

Netgift4, http://web.archives.org/web/20000301055044/www.netgiftregistry.com/cgi-bin/ngr/index.jsp, dated Mar. 1, 2000.*

NetGift5, http://web.archive.org/web/19990508125640/http:..www.netgiftregistry.com/, dated May 8, 1999.*

NetGift6, "Will gift lists click?", New York Times, Nov. 18, 1999.*

NetGift7, "E-commerce counts on servers", Informationweek, Sep. 13, 1999.*

Anonymous, "How controllers get out front in planning corporate portals—the next "killer" accounting app", dated Oct. 2000.*

Monroe, Ann, "Carley's web: Drawing rivals into the internet, Schwab takes its biggest risk", The investment dealers' digest, Jun. 21, 1999.*

Lorek, A new way of shopping: Santa.com; Sun Sentanal, Nov. 28, 1999.*

L.R.Vijayasarathy, et al.; "Print and Internet Catalog Shopping: Assessing Attitudes and Intentions," Internet Research: Electronic Networking Applications and Policy, 2000, p. 191-202, vol. 10, No. 3.

B. Roy, "Using Agents to Make and Manage Markets Across A Supply Web", Complexity, 1998, p. 31-35, vol. 3, No. 4.

A. Iyengar, et al.; "Distributed Virtual Malls on the World Wide Web", Proceedings. 18th International Conference on Distributed Computing Systems, 1998, p. 58-65.

S. Bellman, et al.; "Predictions of Online Buying Behavior", Communications of the ACM, Dec. 1999, p. 32-38, vol. 42, No. 12.

Giftsgalore.com1, Gifts Galore poised to meet increasing demand of online shoppers; web site takes the "shop" out of shopping, Business Wire, Mar. 16, 1999.

Giftsgalore.com2, http://web.archive.org/web/20000407190230/http://giftsgalore.com/, dated Apr. 7, 2000.

OA mailed Sep. 5, 2008 for U.S. Appl. No. 11/101,218, 16 pages.

OA mailed Jan. 9, 2009 for U.S. Appl. No. 11/101,217, 21 pages.

Office Action mailed Sep. 5, 2008 for U.S. Appl. No. 11/101,218, 16 pages.

Office Action mailed Jan. 9, 2009 for U.S. Appl. No. 11/101,217, 21 pages.

Office Action mailed Jan. 2, 2009 for U.S. Appl. No. 11/100,729, 20 pages.

Office Action mailed Jun. 24, 2008 for U.S. Appl. No. 11/100,729, 14 pages.

* cited by examiner

| MERCH ID | MAN ID | PROD ID | MERCH MODEL | PCID | PRICE | SKU | URL | TEXT DESCRIPTION | | |
|---|---|---|---|---|---|---|---|---|---|---|
| 01 | 03 | 13 | NULL | NULL | 29.99 | SKU | DEF | 23 | 199.99 | ABC |
| 09 | 12 | 25 | NULL | NULL | NULL | SKU | NULL | 18 | 149.99 | XYZ |
| 98 | NULL | NULL | NULL | | | | | WIRELESS HEADPHONES | | NULL |
| 99 | NULL | NULL | NULL | | | | | SKIS AND SKIBOOTS | | NULL |

| ITEM | DESCRIPTION | PRICE | CATEGORY |
|---|---|---|---|
| IMAGE OF ITEM #1 | ITEM NAME #1<br>ITEM DESCRIPTION<br>WWW.ABC.COM.PROD | 199.99 | DVD PLAYERS |
| IMAGE OF ITEM #2 | ITEM NAME #2<br>ITEM DESCRIPTION<br>WWW.XYZ.COM.PROD | 149.99 | CD PLAYERS |
| NULL | WIRELESS HEADPHONES<br>ITEM DESCRIPTION<br>WWW.XYZ.COM.PROD | 149.99 | AUDIO PERIPHERALS |
| NULL | SKIS AND SKIBOOTS | NULL | NULL |

BUY (130, 132, 134)

WISH LIST

CROSS-REFERENCE TO RELATED APPLICATIONS

This application is a divisional of U.S. patent application Ser. No. 09/698,379, filed Oct. 27, 2000, and entitled, "WISH LIST." This application is also related to co-pending U.S. patent application Ser. No. 11/100,677, filed on Apr. 7, 2005, entitled, "WISH LIST," co-pending U.S. patent application Ser. No. 11/101,217, filed on Apr. 7, 2005, entitled, "WISH LIST," co-pending U.S. patent application Ser. No. 11/101,218, filed on Apr. 7, 2005, entitled, "WISH LIST," and co-pending U.S. patent application Ser. No, 11/101,206, filed on Apr. 7, 2005, entitled, "WISH LIST." The entireties of the above-noted applications are incorporated herein by reference.

TECHNICAL FIELD

The present invention relates to computer systems, and more particularly to a system and method for facilitating electronic commerce via the Internet.

BACKGROUND OF THE INVENTION

In recent years, there has been an increasing trend of the use of electronic shopping basket applications and/or wish list applications for providing an Internet user a mechanism in which to temporarily store items (e.g., goods, services, and/or offers) prior to purchasing these items electronically and for providing the items to others so that others may purchase the items as a gift to the owner. Typically, these applications reside on a Web server of a merchant or shopping site and are limited to use only on that particular site. A user can visit the merchant's web site and/or shopping portal and temporarily store item's of interest in an electronic item list. The electronic item list can then be reviewed or e-mailed to a third party, such as a friend or family member, so that the third party may purchase these items for the user as a gift. The electronic item list can also be a temporary storage for the user, until the user decides to make a purchase of that item at a later time.

Most item lists are limited to providing only offers to the user, such that the user cannot enter general product categories or manufacturers of items into a user's item list. Additionally, the items that can be added to the user's item list are limited to items or offers residing at the particular site, therefore, item's not residing at the particular site cannot be added to the item list. In some cases portals have implemented electronic shopping lists that have aggregated items across merchants, but often these electronic shopping lists are burdened with similar limitations as discussed above. In some situations smaller merchants cannot afford the membership costs associated with membership of a shopping portal, the costs associated with having their own electronic item list system or may not have the critical mass to justify a single site shopping list. A smaller merchant may wish to participate in a portal shopping list with other merchants (e.g., for critical mass), or may wish to outsource the running of a list on their site to a third party. Another problem with lists is that an item list may employ a database system to retrieve items or offers that reside on a user's item list and once the item or offer is removed from the database (e.g., no longer offered by the merchant), the record is completely removed from the items list. Therefore, there is no current system or method that provides a user with alternatives to the offer or item that has been removed.

Accordingly, there is an unmet need in the art for a system and method that mitigates the above stated deficiencies with traditional electronic item list applications.

SUMMARY OF THE INVENTION

The present invention relates to an electronic item list system and method, such as a wish or gift list, for an electronic shopping mall/online shopping portal, or an item list system provided as a software service. The system and method provides a user with the ability to create a list of items that the user would like others to purchase for the user as a gift (e.g., as a gift registry or as a simple wishlist), or as a list of items that the user would like to retain for a later purchase (e.g., a shopping list). A user interface is provided that allows the user to select items electronically to add to a user specific gift list. The items are not limited to specific offers, but can include general product categories and/or products from a specific merchant or manufacturer. The user interface communicates through an interface component that extracts data from a number of supporting databases. For example, the databases can include a merchant database, an offers database, a manufacturers database and a products database. The interface will extract data from one or all of the databases based on the amount of information in a gift list request and provide the best results. As records are removed from the supporting databases, the interface allows for graceful degradation of the display, such that something is always displayed to the user.

The present invention also allows a user to enter custom elements that do not reside in any of the databases to the item list by employing an "add custom element" user interface. The user can then add custom elements found at different locations on the Internet from merchant's and products that are not registered with the system's databases. The user can add general products or categories of items of interest to the user that may be found online or may be only found offline. Additionally, the user may add small favors or services that the user would like performed for him or her (e.g., do the dishes, cut the lawn, etc). Therefore, structured data and non-structured data can be integrated into the user's item list. Alternatively, elements from other remote Internet sites may be added to a user's item list by providing these sites with code containing a product description and a link to the electronic shopping mall site.

In one aspect of the invention, the system and method allow a remote merchant site, to employ an infrastructure of the item list system to provide their own item list system that appears to reside on the merchant's site. The item list system associates a merchant to a merchant's items that limits a user's item list to products on the merchant's site and provides the appearance to the user that the item list system resides strictly at the merchant's site. The item list system and method therefore provide a merchant with the ability to outsource the functionality of the item list system to provide the merchant's site with a merchant specific item list system.

A wish and/or item list in connection with the present invention may be resident on a personal computing system, third party computing system, network, and any other suitable medium for carrying out the functionality described herein.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The present invention is described with reference to an electronic item list system such as a wish list or gift list system employed with a shopping portal residing on a server computer accessible by a client computer. The present invention also relates to the methodologies employed to provide the functionality associated with the electronic item list system in accordance with the present invention. A page, such as a hypertext mark-up language (HTML) page, can be displayed at a client and is programmed to be responsive to a user selecting one or more elements displayed on the page. It is to be appreciated that although the present example will be illustrated with respect to an architecture employing HTML pages and the World Wide Web, the present invention may be practiced with any network architecture utilizing clients and servers (e.g., an Intranet).

In one aspect of the invention, a plurality of links to an interface component (e.g., one or more Application Service Provider (ASP) components) allow a user to add one or more offers and/or products from merchants to a user's electronic item list. The interface component adds identification numbers corresponding to one or more fields to an item list database. A link is provided that allows a user to display items retained in the electronic item list. The interface component receives a request for display of the items in the item list associated with the link. The interface component uses the identification numbers as keys into various databases and joins as much data from the databases as possible at render time to return to the user.

If data previously available has been removed from the databases, the interface component performs a degradation methodology and returns the best data available. Custom elements can be added to the item list by the user or by a link from a remote merchant site. The item list or a link to the item list can then be e-mailed to a family member or friend. Alternatively, the item list can be printed out and a hard copy given to a family member or friend (e.g., a person that is not literate in use of the Internet or does not have access to the Internet). A gift finder component may also accompany the item list in the case where the family member or friend does not wish to purchase any of the items on the item list. The gift finder component employs attributes about the owner of the item list to search and display item's that may be of interest to the user for purchasing by the family member or friend. In another aspect of the invention, a remote site utilizes the infrastructure of the item list system associated with the shopping portal.

Figure 1:
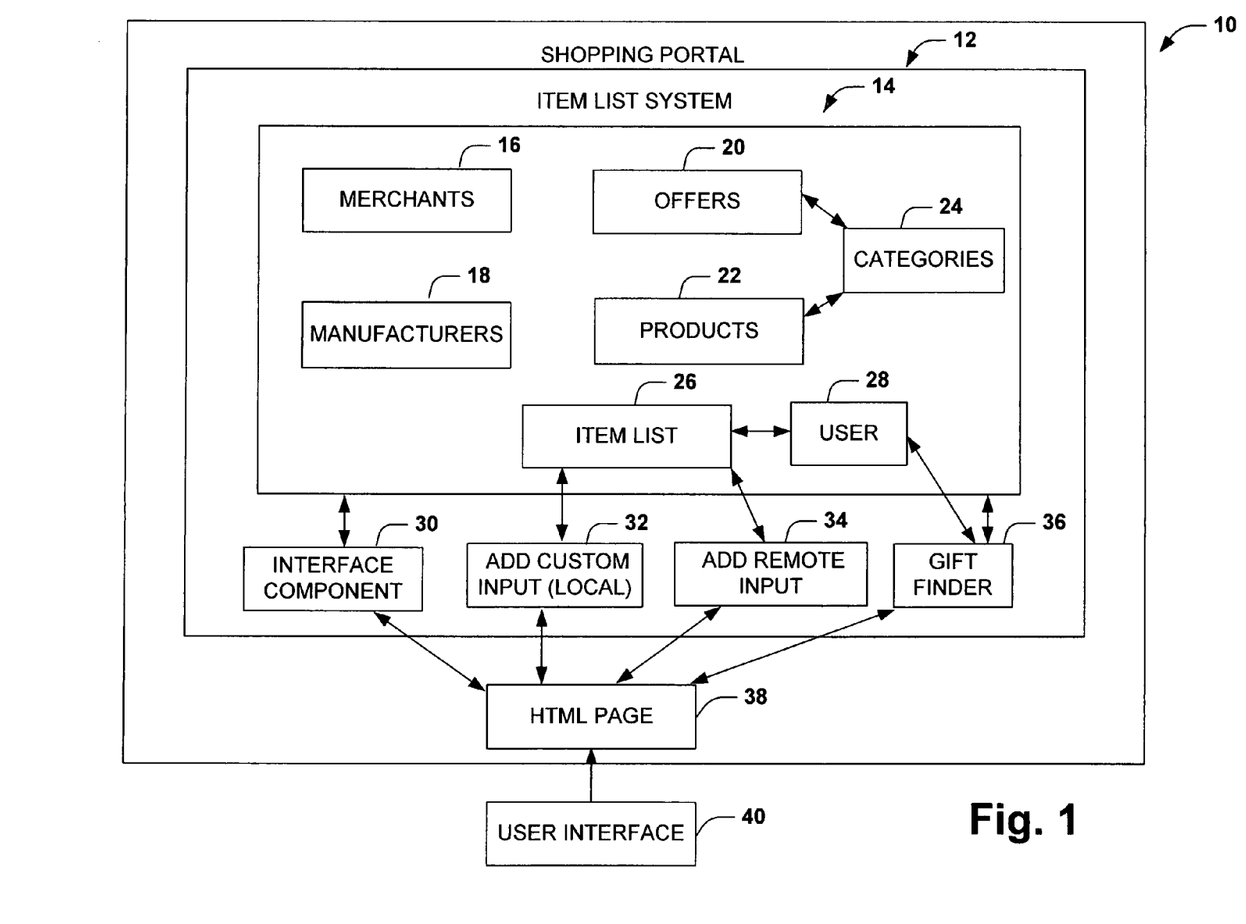
FIG. 1 illustrates a block diagram of an electronic item list system in accordance with one aspect of the present invention.

FIG. 1 illustrates components associated with an electronic item list system 12 being employed at a shopping portal system 10. The item list system 12 includes a database system 14. The database system 14 includes a merchants database 16 for storing a number of different merchant names, a manufacturers database 18 for storing a number of manufacturer names, an offers database 20 for storing a number of offers for items offered by the merchants and a products database 22 for a storing a number of different products that are made by manufacturers. A categories database 24 is provided for storing a variety of item categories. The categories database 24 is illustrated as linked to the offers database 20 and the products database 22. Alternatively, the link from the offers database 20 can be a link to the products database 22, which is an indirect link to the categories database 24. If a category is requested by a user, a search through the offers database 20 and products database 22 will be executed based on particular query parameters being employed by a link to return offer and product results. An item list database 26 is provided for saving data associated with one or more item lists. A user attribute database 28 is linked to the item list database by at least one item list identification number or the like and stores data associated with attributes of the user. In one aspect of the invention, the user attribute database 28 can include user preferences for recommending additional items of interest of the user not in the user's item list that is or was sent to others (e.g., friends and family members).

A user interface 40, such as an Internet browser, may receive a HTML page 38 when visiting the site of the shopping portal system 10. The HTML page 38 includes a number of images and/or links related to product offers, merchant information, product description information and the like. The images and/or links are coupled to functional components residing on the item list system 12. For example, the functional components can be a variety of ASPs, script components or executable components residing at the item list system 12. Additionally, script code can reside in the HTML page itself and be passed to an interpreter and/or functional components residing on the item list system 12.

A plurality of links from the HTML page 38 is provided to an interface component 30 for providing a variety of functions to the shopping portal system 10 and the item list system 12. For example, the interface component 30 can add offers to the item list database 26. Furthermore, the interface component 30 provides the functionality necessary to display the contents of the item list database 26. Upon receiving an instruction from the user to display the contents of the item list database 26, the interface component 30 retrieves information from the item list database 26 and uses this information as keys into the various databases. The interface component 30 then searches through at least one of the plurality of databases, merchants 16, manufacturers 18, offers 20, products 22 and categories 24, and extracts the necessary data for displaying the contents of the item list database 26. The extraction process joins as much data as possible from the databases at render time.

If an item has been removed from the merchant, manufacturer, offer, product and category databases that is in the user's item list (e.g., item list database 26), the interface component 30 is operable to proceed though a series of steps to degrade the data gracefully, such that the best available information within the databases is always provided to the user. For example, if an offer is not available any longer that is in a user's item list, the interface component 30 may then provide the user with a link to the merchant's site or other items that may be similar to the listed item, such as items in a related product class or items in a related product category. If the merchant is not available any longer or the merchant no longer carries the item, the interface component 30 may then provide alternative merchants that may sell the item. The interface component 30 is further operable to provide additional information for the shopping portal 10 during invocations of links to the interface component, such as displaying products and/or offers from requested categories, providing manufacturers for a requested product and merchants for a given manufacturer.

The item list system 12 further comprises a "local add custom input" component 32 for adding custom information to the user's item list. The "local add custom input" component 32 allows a user to add an item to the user's item list that does not reside in any of the databases (e.g., merchants 16, manufacturers 18, offers 20, products 22 or categories 24) in the database system 14. A "remote add input" component 34 is provided to allow a user to add items from merchants at remote sites. The items may be unstructured when the item does not reside or conform to any records in any of the databases (e.g., merchants 16, manufacturers 18, offers 20, products 22 or categories 24) in the database system 14. Alternatively, the item may be described in terms of structured fields similar to items residing in the databases (e.g., merchants 16, manufacturers 18, offers 20, products 22 or categories 24) in the database system 14 or the description may be provided with a link for adding items already residing in one of the databases (e.g., merchants 16, manufacturers 18, offers 20, products 22 or categories 24). The remote site merchants can provide a link at the respective merchant site to the "remote add input" component 34. The link can provide unstructured information about the item such as manufacturer, description, price and a URL from which to purchase the information. The "remote add input" component 34 receives the unstructured information from the remote site and adds it to the item list database 26 in much the same manner as the "local add custom input" 32.

The item list system 12 is also provided with a gift finder component 36. A link to the gift finder component 36 may be provided or combined with an item list sent to family or friends of the owner of the item list. The receiver of the item list may then employ the gift finder component 36 to select a gift for the owner of the item list based on the owner's attributes instead of selecting an item from the owner's item list. The gift finder component 36 is operable to search the user database 28 containing attributes of the user. The gift finder component 36 then employs these attributes to search the other databases similarly to the interface component 30 to find products, offers, categories, manufacturers and merchants for items that may be of interest to the user based on the user's attributes. Alternatively, attributes of the user may be entered into an input form. The gift finder component 36 can then employ the entered attributes to search products, offers, categories, manufacturers and merchants for items that may be of interest to the user.

Figure 2:
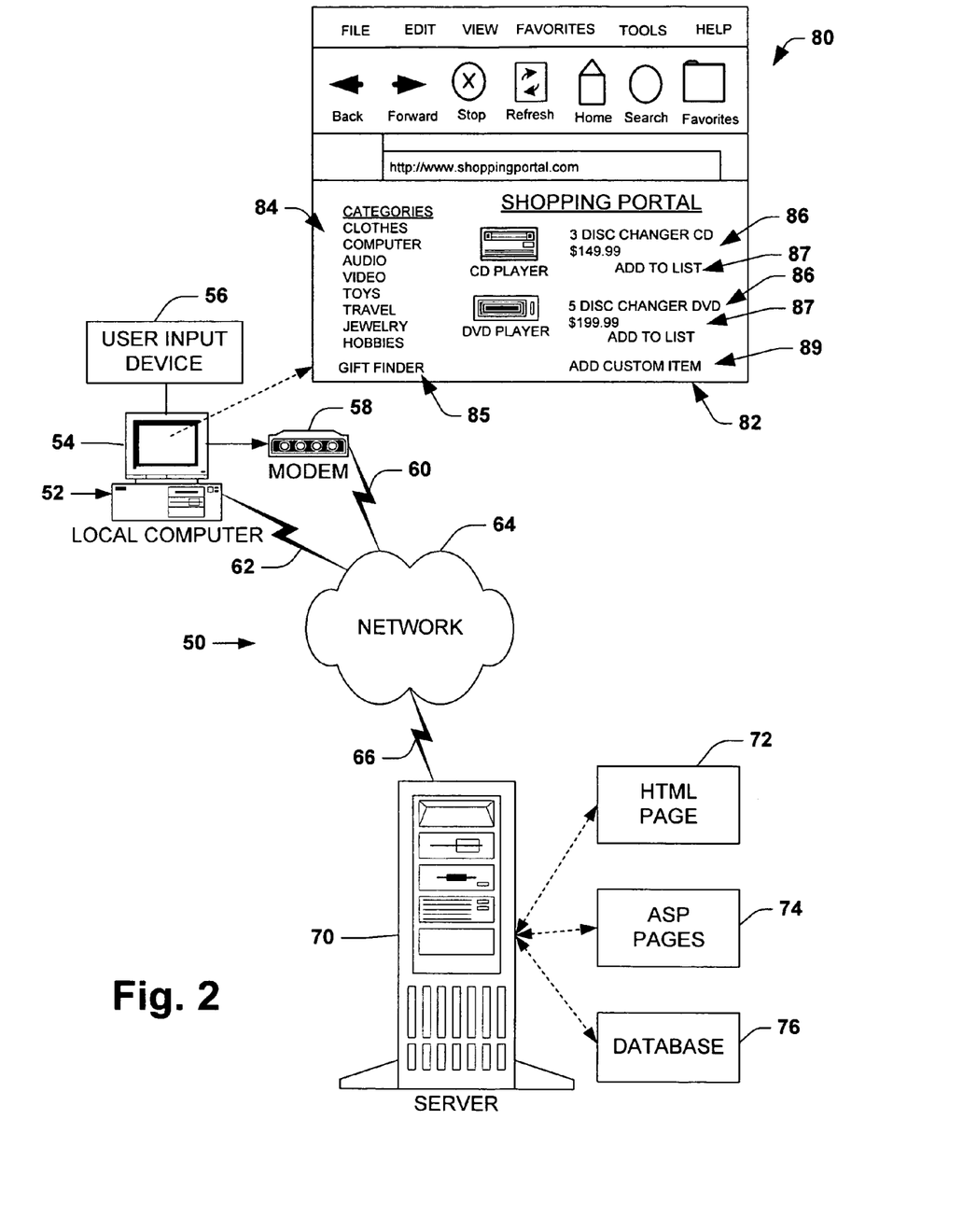
FIG. 2 illustrates a possible environment of the electronic item list system in accordance with one aspect of the invention.

An example of a possible environment 50 for the shopping portal 10 and item list system 12 is illustrated in FIG. 2. The environment 50 includes a local computer 52 having a display 54 and a user input device 56 through which an individual may interact with the local computer 52. The user input device 56, for example, may include a keyboard, a pointer device (e.g., a mouse), a voice activated control device, a wireless input device, and/or other equipment or peripherals through which a user may interact with programs running on the local computer 52.

The local computer 52 is operatively coupled to a network 64, such as an Internet, an intranet, or another computer network. The local computer 52 is connected to the network 64, for example, over a telephone line 60 via a modem 58. Alternatively, the local computer 52 may be connected to the network 64 through another connection 62, such as an integrated services digital network (ISDN), T1, DS1 or other high speed telecommunications connections and an appropriate connection device, a television cable and modem, a satellite link, an optical fiber link, an Ethernet or other local area network technology wire and adapter card, radio or optical transmission devices, etc. It is to be appreciated that the invention also may be implemented in a browser environment for other public and private computer networks, such as a computer network of a commercial on-line service or an internal corporate local area network (LAN), an Intranet, or like computer network.

The local computer 52 runs software, including a browser 80, for unified browsing of electronic documents and other data from local sources as well as from the computer network 64. Specifically, documents for browsing with the browser software may reside as files of a file system stored in appropriate storage devices at the local computer 52 or reside at resources at a remote computer 70. The remote computer 70 is operatively coupled to the network 64 via connection 66, which may be in the form of a telecommunications connection and appropriate device or any other communications link (including wired and wireless) to the network. By way of example, the remote computer 70 is an Internet-based server connected to the computer network 64 to provide one or more World Wide Web ("Web") sites to which the local computer 52 may connect.

By way of example, a document 72 resides at the remote computer 70 that conforms to HTML standards, and may include extensions and enhancements of HTML standards, such as Dynamic HTML (DHTML). It is to be appreciated that the browser software running at the local computer 52 may be capable of browsing documents having other data formats from the local computer or the remote computer 52. In addition, the illustrated document 52 may incorporate other information content, such as graphical images, audio, video, executable programs, etc. In conformance with DHTML standards, each feature of information content on the page 72 (e.g., each word and each image) may be considered an object or element selectable by the user of the local computer 52, such as by employing the user input device 46 when connected to the Web page associated with the documents 72. The elements and information content of the document 72 are stored in a file system at the remote computer 70. The document at the remote computer 70 incorporates the information using HTML tags and uniform resource locators (URLs) that specify the location of files or other Internet resources containing the images on the network 64.

The browser software running locally on the local computer 52 displays the HTML document 72 in a window 82 or area of the local computer's display 54 allocated to the browser by the operating system. The window 82 includes a document display area 86 and user interface controls (not shown). The browser displays a representation of the document 72 within the document display area 86 of the window 82, although other display types also may be used. The displayed document may include text and/or images corresponding to the document 72.

In the example shown in FIG. 2, the display area 86 includes a display of a shopping portal web page. The shopping portal web page includes page elements such as item offer elements 86 having descriptions and images of the item being offered, a plurality of category elements 84, a gift finder element 85, an add to list instruction elements 87, and an add custom item to list instruction element 89. The page elements have associated parameters and associated links to ASP pages 74 located at the remote computer 70. The ASP page 74 includes server-side scripting for processing the data received from the local computer 52 and sending to the local computer 52 an appropriate response based on the received data. The remote computer 70 includes one or more searchable databases 76 that contain, for example, records of items, manufacturers of items, merchant of items, offers of items and categories of items. It is to be appreciated that any searchable database structure may be employed without departing from the spirit and scope of the present invention.

The ASP pages 74 have an associated script for performing the various functions of the shopping portal system 10 and item list system 12 described in FIG. 1. The associated script can perform the appropriate database extraction or query from the one or more databases 76 and display a new page with results of the extraction or query. By way of example, functions may be invoked by action from the user input device 56, such as a pointer device (e.g., at a mouse-up event) or a keyboard (e.g., based on predefined keystrokes). While in this particular example the data is submitted to an ASP page, it is to be appreciated that any other type of server component may be programmed and/or configured to receive data from the client and communicate the received data with a database on the server (e.g., a Common Gateway Interface (CGI) page can do this).

It is to be appreciated that the shopping portal web page of FIG. 2 illustrates only one possible example of utilizing aspects of the present invention. For example, although the present example illustrates a single add custom item to list instruction element 89 associated with a single item list, a plurality of add to custom item list instruction elements 89 may be provided with each add to custom item list instruction associated with a corresponding item list. Furthermore, each item list may have an associated list management system. The list management system may provide functions such as delete item, add custom element, print item list, create new item list and delete current item list. Additionally, the add to list instructions 87 are not limited to an associating with strictly offers, but may also be associated with categories of items, manufacturers of items and the items themselves.

Figure 3:
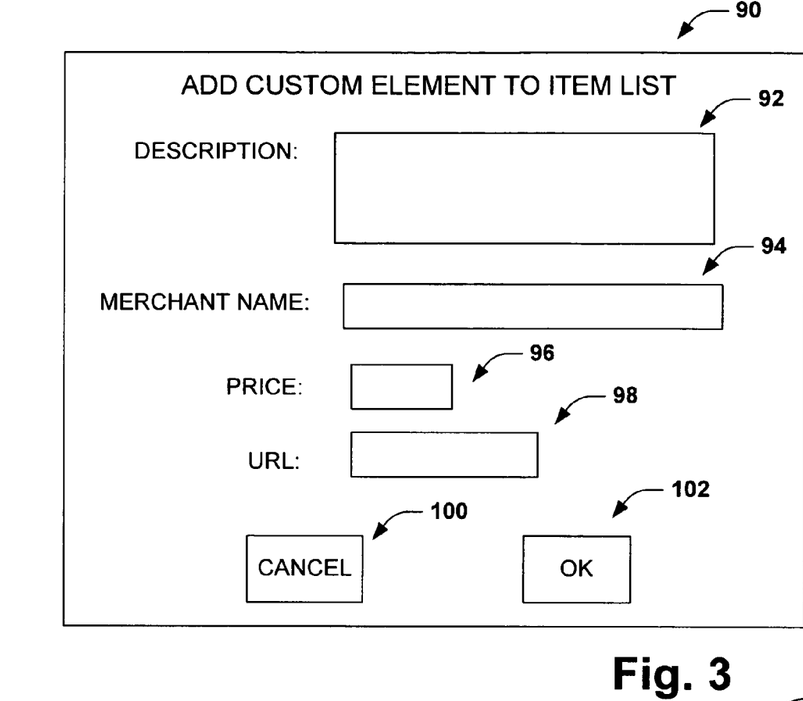
FIG. 3 illustrates an input screen for providing custom elements to the item list system in accordance with one aspect of the present invention.

FIG. 3 illustrates an example of an input screen 90 that may be provided upon invocation of the "local add custom input" component 32. The input screen 90 includes a description field 92 for providing unstructured data to the item list database 26 in the form of a textual description (e.g., a name of a product or a description of a product). The input screen 90 also includes fields for structure data such as merchant name 94, price 96 and a URL 98. After the data is entered into the fields by a user input device, such as a keyboard, the user may add the custom element to the item list database 26 by clicking on the "OK" button 102, for example, by employing a computer pointer, such as a mouse. The user may click on the "cancel" button 100 to close the input screen 90 without adding a custom element to the item list database 26. A custom element may also be added to the item list database 26 at a remote merchant site.

Figure 4:
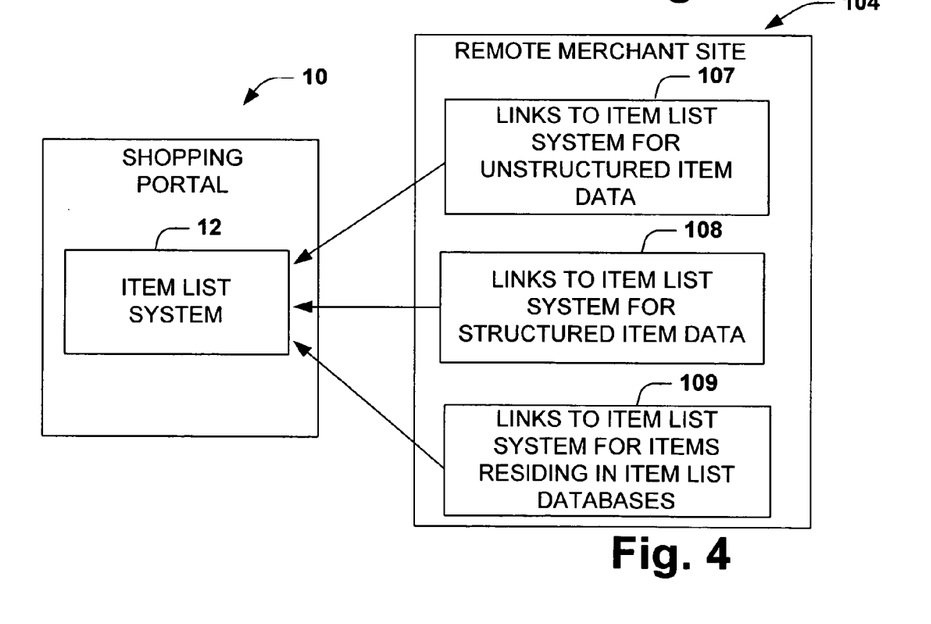
FIG. 4 illustrates a block diagram of a remote site having product links to the item list system in accordance with one aspect of the present invention.

FIG. 4 illustrates a methodology employed for adding remote items from a remote merchant site 104 to the item list database 26. The remove merchant site 104 may be provided with one or more links to the item list system 12 for unstructured item data or descriptions 107 (e.g., custom elements), one or more links to the item list system 12 for structured item data or descriptions 108 (e.g., data conforming to the structure of the databases in the item list system) and one or more links to the item list systems for items already residing in data bases 109 of the item list system 12. The links 107, 108 and 109 reference or call the "add remote input" component 34 of the item list system 12 and the web site of the shopping portal 10. The links 107 and 108 pass input fields to the "add remote input" component 34, which adds the entry to the item list database 26.

Figure 5:
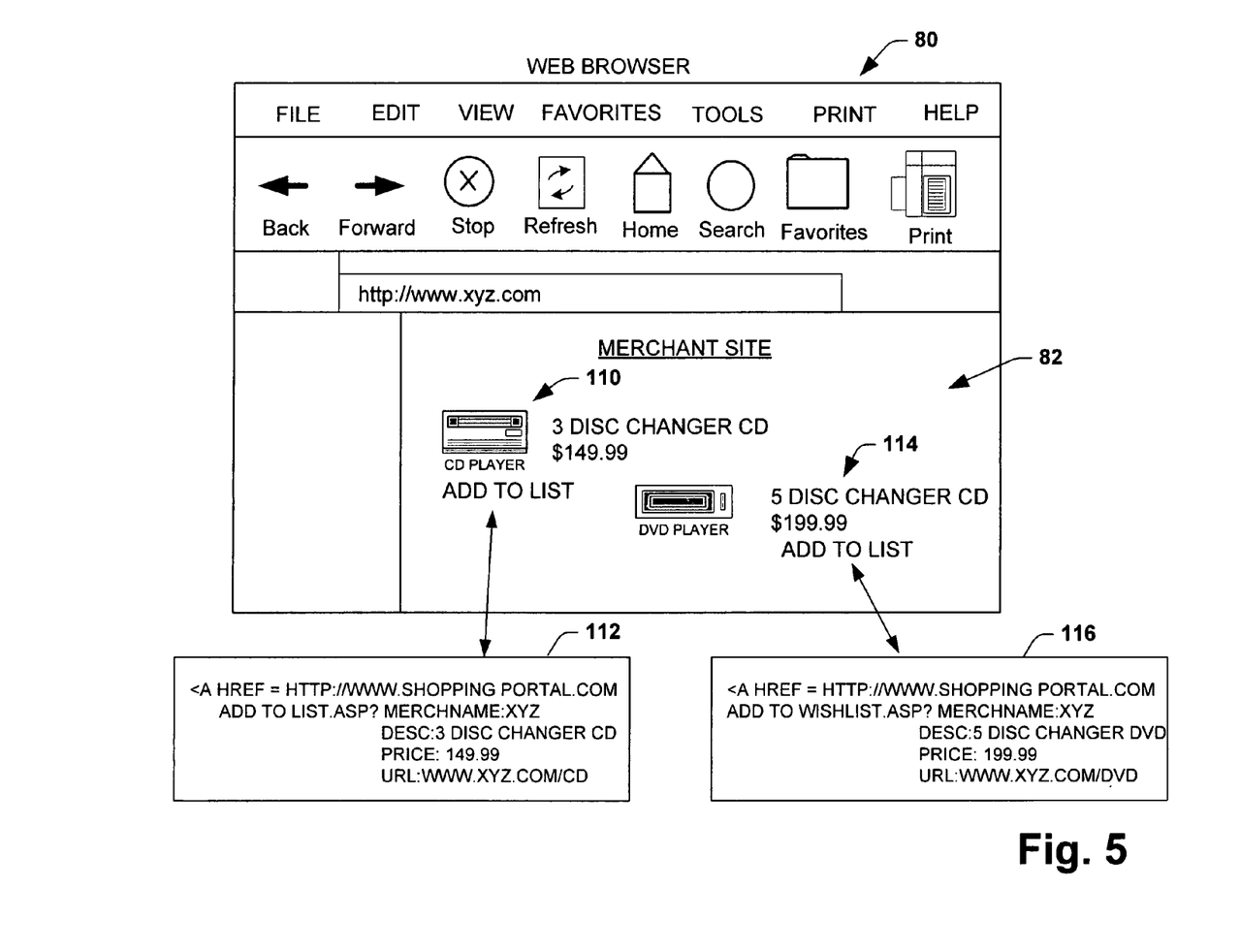
FIG. 5 illustrates an example of a possible mechanism for providing product links to the item list system of a remote merchant site in accordance with one aspect of the present invention.

FIG. 5 illustrates an example of an entry of a custom element from a remote merchant site as experienced by a user employing the browser 80. A user visits a merchant site through the browser 80 providing a view of the merchant site in the display 82. The site includes elements similar to the elements illustrated on the shopping portal page of FIG. 2. The merchant web site includes page elements such as item offer elements having descriptions and images of the item being offered and "add to list" instruction elements. In the present example, a first page element 110 is provide that includes a CD player image with an associated description and price offer and a second page element 114 that includes a DVD player image with an associated description and price offer. A first instruction page element labeled "ADD TO ITEM LIST" is provided under the first page element 110 and a second instruction page element "ADD TO ITEM LIST" is provided under the second page element 114. The first instruction page element is associated with a first code portion 112 and the second instruction page element is associates with a second code portion 116. In the present example, the first and second code portions 112 and 116 include links to a script (e.g., an ASP script authored with Microsoft IIS) on the shopping portal site and a set of attributes or fields associated with the displayed product offer, such as merchant name, product description, price and URL where the product description can be found. A selection of an item from the merchant site to add to the user's item list invokes the code associated with that item. The invocation of the code causes a link to be provided to the appropriate ASP page residing at the shopping portal. The ASP page then executes and adds the item to the item list database 26. It is to be appreciated that the example of FIG. 5 is merely for illustrative purposes and actual implementation would be apparent to those skilled in the art.

Figures 6, 7:
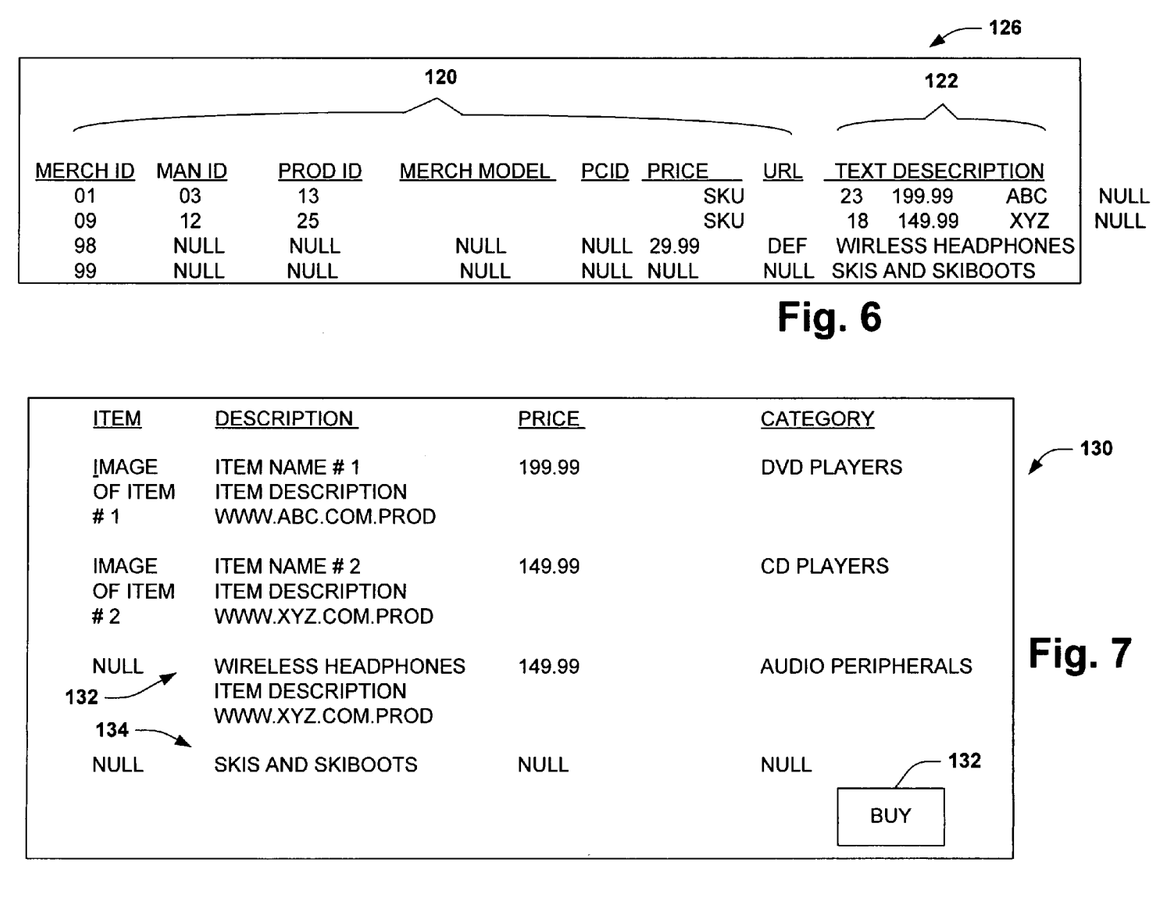
FIG. 6 illustrates an example of structured and unstructured data residing in an item list database in accordance with one aspect of the present invention.
FIG. 7 illustrates an example of a possible item list display having both structured and unstructured data in accordance with one aspect of the present invention.

It is to be appreciated that the present system provide for storing and displaying an item list with both structured data and unstructured data concurrently. FIG. 6 illustrates an example of records of items residing in the item list database 26. In the present example, a plurality of record fields are provided for holding information relating to a product offer. The record fields include a structured portion and an unstructured portion. The structure portion includes the following fields: MERCHANT ID, MANUFACTURER ID, PRODUCT ID MERCHANT MODEL (e.g., sku number of product offer from merchant), CATEGORY ID, PRICE AND URL. The unstructured data includes a text description and a merchant name, which may be provided by a user employing the "local add custom input" component or the "remote add custom input" component. It is to be appreciated that the above fields are an example of fields that may be employed for records in the item list database 26 and any number of fields structured and unstructured may be employed to carry out the present invention.

FIG. 7 illustrates an example of a result report 130 that may be generated in a response to a request to view a user's item list corresponding to records in the item list database 26, as illustrated in FIG. 6. The result report 130 includes an item field, a description field, a price field and a category field for each record. As can be seen from the result report 130, both structured data and unstructured data are provided in the description field such that items available and not available at the shopping portal system 10 can be retained and viewed within a single item list. For example, the first two records contain structured data with corresponding entries in other databases (e.g., merchants 16, manufacturers 18, offers 20, products 22 or categories 24) on the shopping portal 10. A "buy" selection button 132 is provided to provide a link for the user to buy the item by selecting one of the items having structured data with a computer pointer and clicking on the "buy" selection button 132. The third record was added by the "remote add input" component 34 and includes a description field 132 with the text description "WIRELESS HEADPHONES" that is unstructured data and the URL "www.xyz.com.prod", which is structured data. The fourth record was added by the "local add custom input" component 32 and includes a description field 134 with the text description "SKIS AND SKIBOOTS" which is unstructured data. Therefore, structure and unstructured data is integrated into the item list for both different independent records and within the same independent records. Any unavailable fields are returned as nulls and not reported.

It is to be appreciated that links can be provided to structured data. For example, a user can click on the item name and be provided with another page having additional information with respect to the item at the merchant's site and for purchasing the item for items 1 and 2 illustrated in FIG. 7. A user can click on the URL of the merchant and be transferred to the merchant's site for any or all of the items illustrated in FIG. 7. Furthermore, the user can click on the category text and be transferred to a plurality of products for that category. If the offer is no longer available for an item, the interface component will gracefully degrade the record and provide the best available information, such as the URL of the merchant and the category of the offer.

Figure 8:
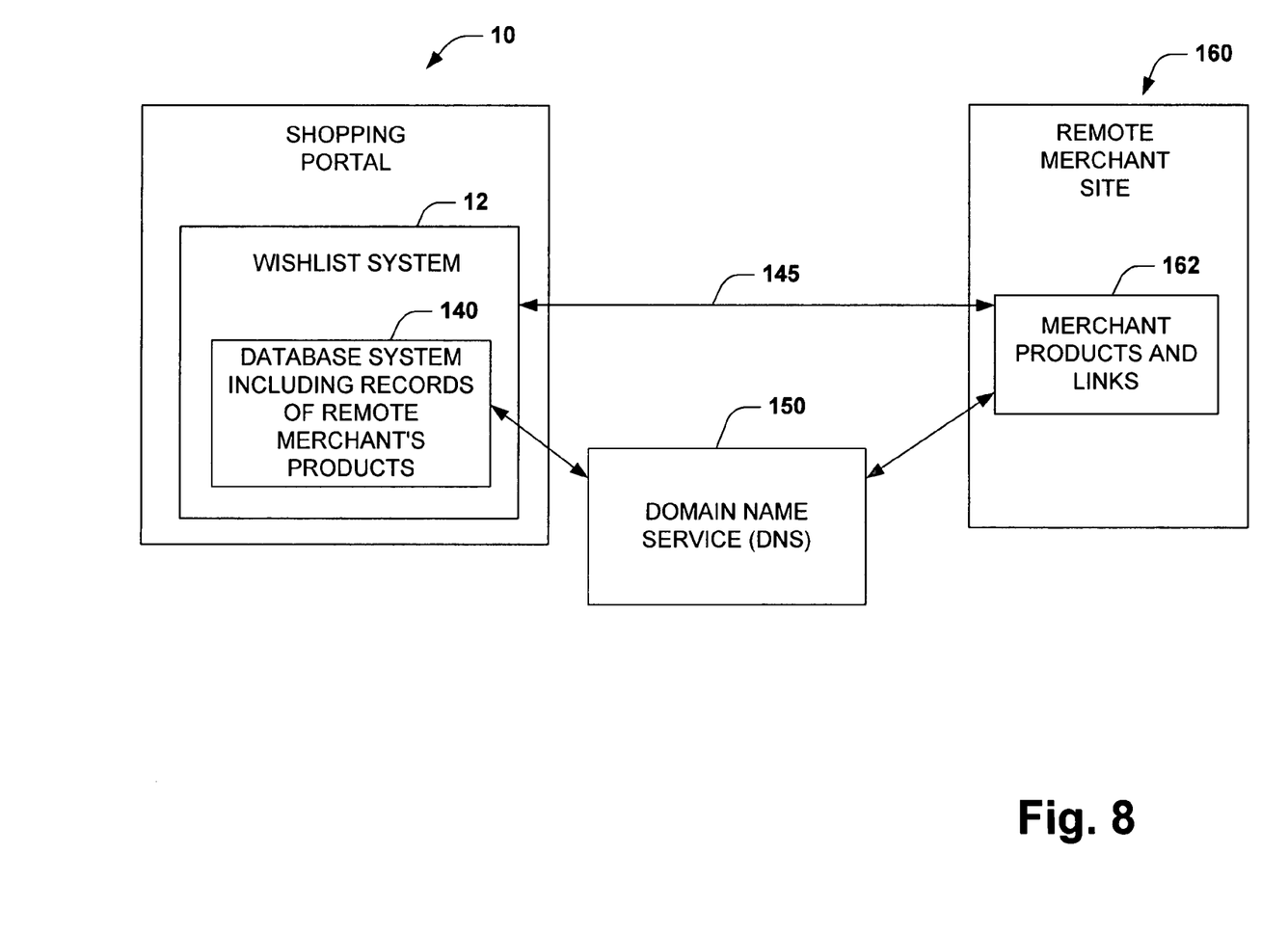
FIG. 8 illustrates an example of a possible mechanism for employing the infrastructure of the item list system to a remote merchant site in accordance with one aspect of the present invention.
Figure 9:
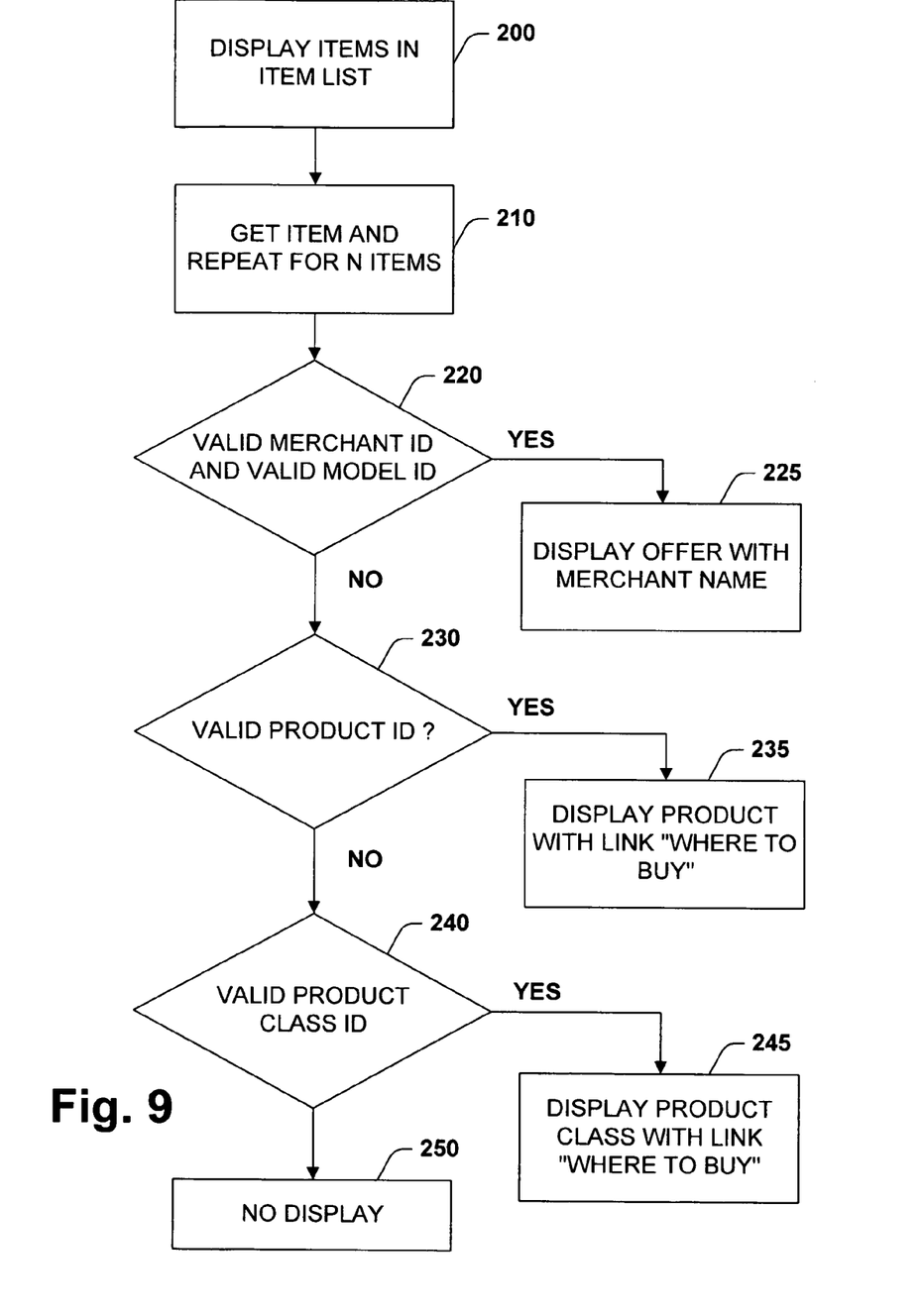
FIG. 9 illustrate one particular methodology of degradation of items in the item list as records are removed from at least one of the databases in accordance with one aspect of the present invention.
Figure 10:
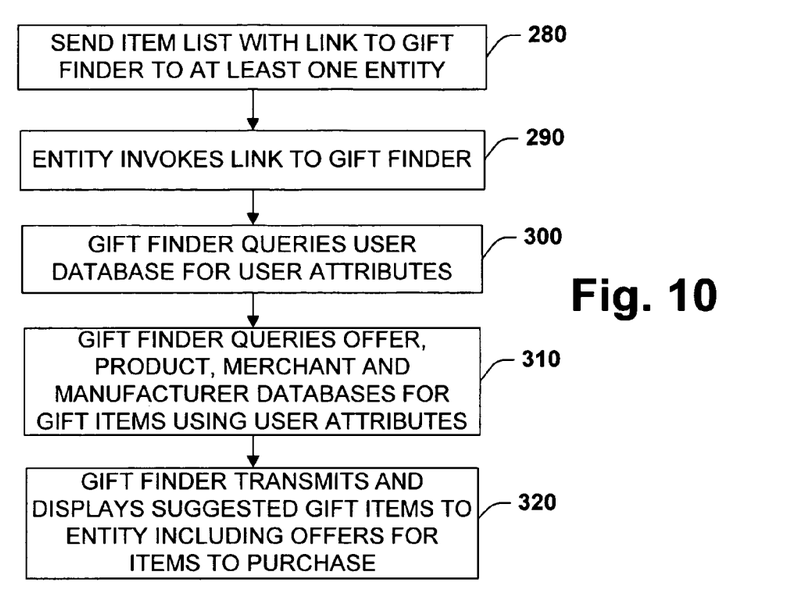
FIG. 10 illustrate one particular methodology for finding a gift suggestion of an item list owner employing at least one of the databases of the item list system in accordance with one aspect of the present invention.
Figure 11:
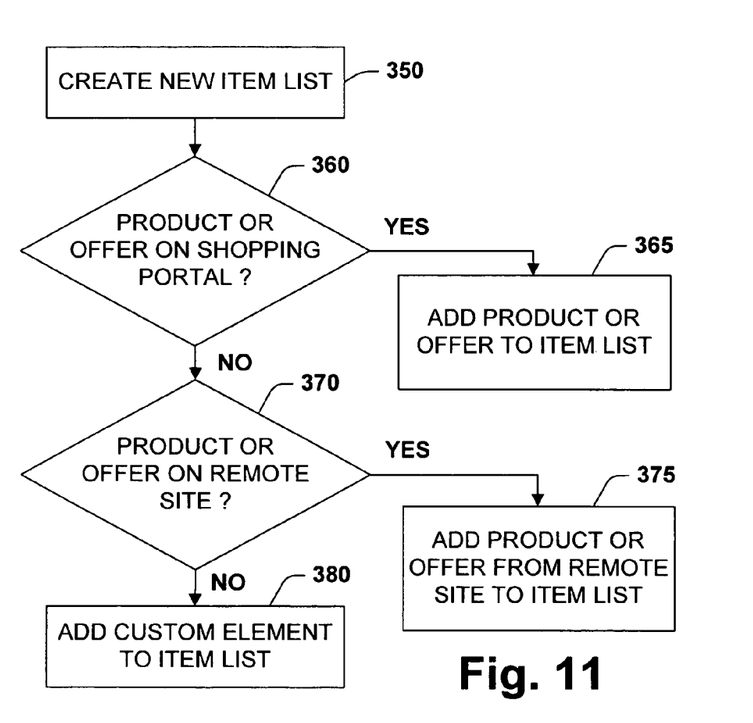
FIG. 11 illustrate one particular methodology for adding items to a user item list employing the item list system in accordance with one aspect of the present invention.

In another aspect of the invention, the infrastructure of the item list system 12 is utilized by a remote merchant site, such that the item list system appears to be residing at the remote merchant site and the fact that it resides at the shopping portal system 10 is transparent to the user. FIG. 8 illustrates one particular system and methodology of carrying out this aspect of the invention. A remote merchant site 160 is provided with a plurality of merchant products and links 162. The remote merchant site 160 links to the shopping portal site 10 over an Internet connection 145 or the like. The item list at the shopping portal system 10 contains a database of items 140, with each item in the database containing a field indicating the merchant of the item. The remote merchant site 160 requests the shopping portal 10 to display a list of items, and the shopping portal 10 filters the list displaying only items from the merchant. Therefore, only merchant products can be added to the user's item list at the merchant's site, such that it appears that the item list resides on the merchant's site and is part of a merchant's item list system. The display of items can be displayed with the look and feel of the shopping portal, or can contain only merchant branding making it appear to the user that the page is being served by the merchant. A domain name service (DNS) component 150 could also be employed to allow the URL in the browser to appear as if the URL was pointing to an entry at the merchant. In view of the structure described above with respect to FIGS. 1-8, a methodology for providing the particular aspects of the invention may be better appreciated with respect to the flow diagrams of FIGS. 9-11. While, for purposes of simplicity of explanation, the methodologies of FIGS. 9-11 are shown and described as a series of steps, it is to be understood and appreciated that the present invention is not limited to the order of steps, as some steps may, in accordance with the present invention, occur in different orders and/or concurrently with other steps from that shown and described herein. Moreover, not all illustrated steps may be required to implement a methodology in accordance with an aspect the present invention.

FIG. 9 illustrates a methodology for graceful degradation of data referenced in an electronic item list and residing in one or more databases. The method of degradation provides the best available data to the user when previously available data has been removed from the databases. At step 200, the interface component 30 receives a request for displaying data referenced on the item list of the user. The interface component queries one or more databases to get the items referenced in the database at step 210. At step 220, the interface component determines for each item of N items in the item list database 26, if the data returned from the one or more databases has a valid merchant ID and a valid merchant model ID. If the data does contain a valid merchant ID (e.g., either null or no corresponding entry in the merchant database) and a valid merchant model ID (YES), the interface component 30 will display the offer of the product with the merchant name and web site for purchase of the item. If the data does not contain a valid merchant ID and a valid merchant model ID, the interface component 30 will proceed to step 230. At step 230, the interface component 30 determines if the data returned from the one or more databases has a valid product ID. If the data does contain a valid product ID (YES), the interface component 30 will display the particular product with links to merchants for buying the particular product. If the data does not contain a valid product ID, the interface component 30 will proceed to step 240. At step 240, the interface component 30 determines if the data returned from the one or more databases has a valid product class ID. If the data does contain a valid product class ID (YES), the interface component 30 will display the product class or category with links to merchants for buying these types of product class or categories. If the data does not contain a valid product class ID (NO), the interface component 30 proceeds to step 250 where nothing is displayed.

FIG. 10 illustrates a methodology for utilizing the gift finder component 36. At step 280, a user sends an item list with a link to the gift finder component 36 to at least one entity. At step 290, the entity determines that the entity does not want to purchase any of the items on the user's wish list, so the entity invokes the link to the gift finder component 36. At step 300, the gift finder component 36 queries the user database 28 for user attributes. At step 310, the gift finder component 36 queries at least one of the offers database 20, products database 22, merchants database 16, manufacturers database 18 and categories database 24 for gift items using the user attributes. At step 320, the gift finder component 36 transmits and displays potential gift items that may be of interest to the user to the entity including offers for items to purchase.

FIG. 11 illustrates an example of a methodology that a user can follow for adding items to an item list. At step 350, the user creates a new item list. At step 310, the user determines if the desired product or offer resides on the shopping portal. If the product or offer does reside on the shopping portal (YES), the user proceeds to step 365 and adds the product or offer to the item list. For example, the shopping portal 10 can have a simple link that adds items to the list. References to the fields of structured data associated with the item are then added to the item list database 26. If the product or offer does not reside on the shopping portal (NO), the user proceeds to step 370 to determine if the product or offer resides on a remote site employing a link to the shopping portal. If the product or offer resides on a remote site employing a link to the shopping portal (YES), the user proceeds to step 375 and adds the product or offer to the item list. The structured data and/or unstructured data associated with the item is then added to one or more databases in the item list database system 14 and references to the fields of the data is then added to the item list database 26. If the product or offer does not reside on a remote site employing a link to the shopping portal (NO), the user proceeds to step 380 and adds a custom element to the item list. The structured and/or unstructured data of the custom element is then added to one or more databases of the item list system and references to fields of the custom element are added to the item list database 26. The user can then view the item list employing the interface component 30. The interface component 30 uses the references in the item list database 26 to retrieve the results from the one or more databases in the item list system and then the interface component integrates the structured and non-structured data of the results prior to displaying. Alternatively, the user can send a copy of the item list to a third party.

Figure 12:
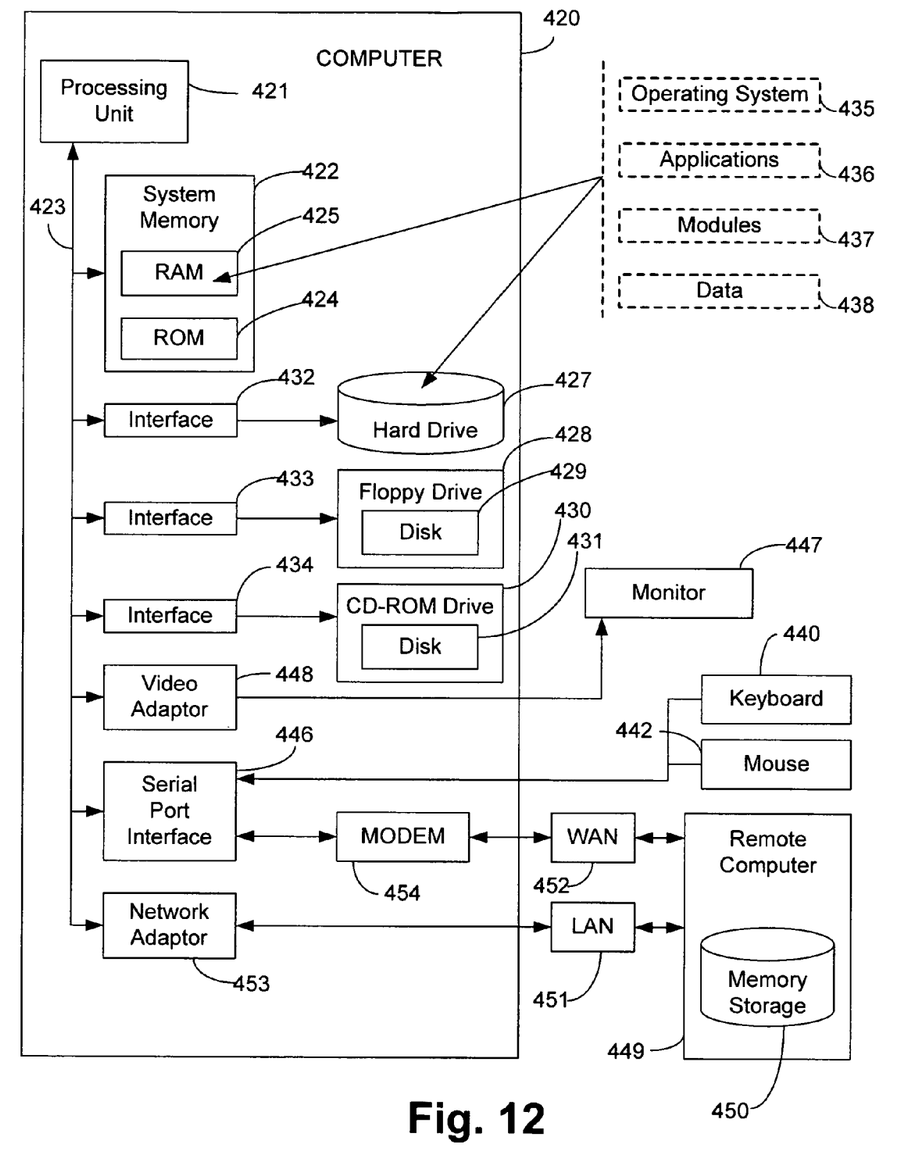
FIG. 12 illustrates a block diagram of a computer system in accordance with an environment of the present invention.

With reference to FIG. 12, an exemplary system for implementing the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. The operating system 435 in the illustrated computer can be Microsoft Windows NT Server operating system, together with the before mentioned Microsoft Transaction Server, Microsoft Windows 95, Microsoft Windows 98 or Microsoft Windows 2000.

A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote server or client computer 449. The remote computer 449 may be a workstation, a server computer, a router, a peer device or other common network node, and typically includes many or all of the elements described relative to the computer 420, although only a memory storage device 450 has been illustrated in FIG. 12. The logical connections depicted in FIG. 12 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A method that provides an electronic item list for items residing on the Internet comprising:
employing a processor executing computer executable instructions to perform the following acts:
providing at least one database that stores information with respect to items, the information that can be stored per item are at least, a product identification, a product class identification, a merchant identification, and a merchant model identification;
providing an item list database that stores at least one list of references to one or more of the items stored in the at least one database, a list has references to items that a user has added to the list based upon their desire for the items;
receiving a request from a requestor for a list from the item list database;
accessing the item list database to retrieve the list;
extracting data from the at least one database that corresponds to the references in the list; and
utilizing the extracted data to degrade and display the requested item list to the requestor, wherein for each item in the list:
determining if the item in the list has a valid product identification and a valid merchant identification;
upon determining that the item in the list has a valid product identification and a valid merchant identification, displaying the item with a link to the item at a merchant identified by the merchant identification;
upon determining that the item in the list does not have a valid product identification and a valid merchant identification, determining if the item in the list has a valid product identification;
upon determining that the item in the list has a valid product identification, displaying the item with link(s) to one or more merchants for buying the item represented by the product identification;
upon determining that the item in the list does not have a valid product identification, determining if the item in the list has a valid product class identification;
upon determining that the item in the list has a valid product class identification, displaying the product class with link(s) to one or more merchants that for buying items represented by the product class identification; and
upon determining that the item in the list does not have a valid product class identification, displaying nothing for the item.

2. The method of claim 1, further comprising joining structured and unstructured data.

3. The method of claim 1, further comprising inputting custom items into the item list database.

4. The method of claim 1, further comprising providing a link and a product description at a remote merchant site that allows a user to add items from a remote site to the item list database.

5. The method of claim 1, further comprising linking the infrastructure of the item list to a remote site, the item list appears to reside on the remote site.

6. The method of claim 1, further comprising providing links from selectable items on at least one HTML page, the links allow a user to select items from an electronic web-site to add to the item list.

7. A computer-readable medium having computer-executable instructions that perform the steps of claim 1.

8. A system that provides an electronic item list for items residing on the Internet comprising:
a processor:
a memory communicatively coupled to the processor, the memory having stored therein computer-executable instructions to implement the system, including:
at least one database that stores information with respect to items, the information that can be stored per item are at least, a product, a specific manufacturer and a specific merchant;
an item list database that stores lists of references to the items stored in the at least one database, a list has references to items that a user has added to the list based upon their desire for the items, wherein at least one item in the list is specified only as a specific manufacturer or a specific merchant;
a request received from a requestor for at least one item associated with the information in the at least one database;
a gift finder component that accesses the item list database for the references to the at least one item and extracts data from the at least one database that corresponds to the references; and a user interface component that utilizes the extracted data to degrade and display the requested item list to the requestor wherein for each item in the list:
  the user interface component displays determines if the item in the list has a valid product identification and a valid merchant identification;
  upon determining that the item in the list has a valid product identification and a valid merchant identification, the user interface component displays the item with a link to the item at a merchant identified by the merchant identification;
  upon determining that the item in the list does not have a valid product identification and a valid merchant identification, the user interface component displays determines if the item in the list has a valid product identification;
    upon determining that the item in the list has a valid product identification, the user interface component displays the item with link(s) to one or more merchants for buying the item represented by the product identification;
  upon determining that the item in the list does not have a valid product identification, the user interface component displays determines if the item in the list has a valid product class identification;
  upon determining that the item in the list has a valid product class identification, the user interface component displays the product class with link(s) to one or more merchants that for buying items represented by the product class identification; and
  upon determining that the item in the list does not have a valid product class identification, the user interface component displays nothing for the item.

* * * * *